United States Patent [19]
Cacciola et al.

[11] Patent Number: 5,623,252
[45] Date of Patent: Apr. 22, 1997

[54] LIQUID LEVEL DETECTOR USING AUDIO FREQUENCIES

[76] Inventors: John A. Cacciola; Randal J. Cacciola, both of 505 Pine Tree Dr., Severna Park, Md. 21146

[21] Appl. No.: 447,293

[22] Filed: May 22, 1995

[51] Int. Cl.⁶ .................................................. G08B 21/00
[52] U.S. Cl. ...................... 340/618; 324/662; 324/658; 340/612; 73/290 R
[58] Field of Search .................... 340/618, 612; 324/662, 658, 663; 73/290 R, 304 C

[56] References Cited

U.S. PATENT DOCUMENTS

| | | | |
|---|---|---|---|
| Re. 34,601 | 5/1994 | Hochstein | 73/304 C |
| 3,581,197 | 5/1971 | Morey, Jr. | 324/61 |
| 4,002,996 | 1/1977 | Klebanoff et al. | 331/65 |
| 4,074,244 | 2/1978 | Balderson | 340/618 |
| 4,341,178 | 7/1982 | Price | 340/618 |
| 4,347,740 | 9/1982 | Townsend | 73/304 C |
| 4,555,941 | 12/1985 | Fathauer et al. | 73/304 C |
| 4,591,839 | 5/1986 | Charboneau et al. | 340/620 |
| 4,676,101 | 6/1987 | Baughman | 73/304 C |
| 4,782,698 | 11/1988 | Wilson | 73/304 C |
| 4,800,755 | 1/1989 | Fathauer et al. | 73/304 C |
| 4,806,847 | 2/1989 | Atherton et al. | 324/61 P |
| 4,912,976 | 4/1990 | Labriola, II | 73/290 R |
| 4,947,689 | 8/1990 | Hochstein | 73/304 C |
| 4,987,776 | 1/1991 | Koon | 73/304 C |
| 5,012,683 | 5/1991 | Davis | 73/290 R |
| 5,049,826 | 9/1991 | Sasao | 324/662 |
| 5,103,368 | 4/1992 | Hart | 361/284 |
| 5,103,672 | 4/1992 | Terry, Jr. et al. | 73/304 C |
| 5,138,880 | 8/1992 | Lee et al. | 73/304 C |
| 5,142,909 | 9/1992 | Baughman | 73/304 C |
| 5,148,125 | 9/1992 | Woodhead et al. | 331/135 |
| 5,182,545 | 1/1993 | Goekler et al. | 73/304 C |
| 5,245,873 | 9/1993 | Fathauer et al. | 73/304 C |
| 5,287,086 | 2/1994 | Gibb | 340/618 |
| 5,315,872 | 5/1994 | Moser | 73/304 C |
| 5,365,783 | 11/1994 | Zweifel | 73/304 C |
| 5,408,223 | 4/1995 | Guillemot | 340/618 |

Primary Examiner—Thomas J. Mullen, Jr.
Assistant Examiner—John Tweel, Jr.
Attorney, Agent, or Firm—Michael F. Petock, Esq.

[57] ABSTRACT

A liquid level detecting system which utilizes audio frequency with components having sizes and values usually associated with RF frequencies, thereby providing the reliability and low cost of audio components with the small size typically associated with RF systems. A conductive element is mounted within a container, the conductive element is provided with an insulative coating. A large change in capacitance and capacitance reactance is produced when the insulated conductive element is immersed in a conductive liquid. The change in output of the audio oscillator, passed through the low pass network, which includes the capacitance of the conductive element is fed to an active detector. In one application, the detector is utilized to sense the level of water in a fuel/water separator and, in a second application, a pair of liquid level detectors are utilized to control the operation of a bilge pump.

7 Claims, 2 Drawing Sheets

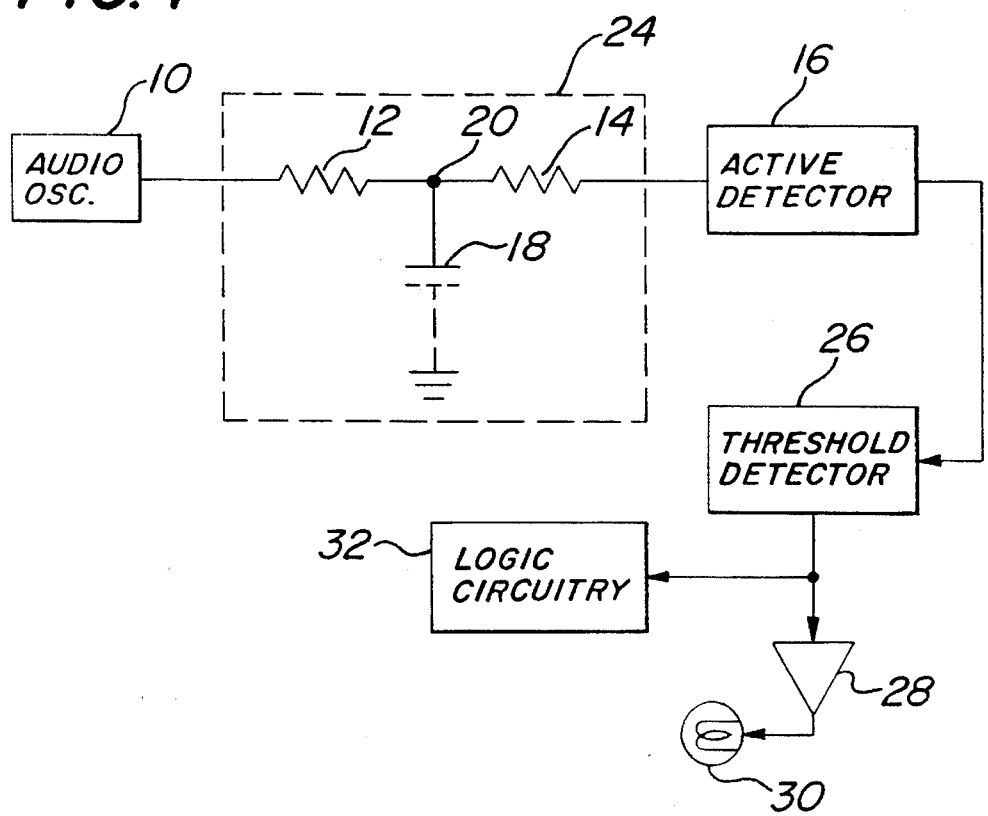
FIG. 1
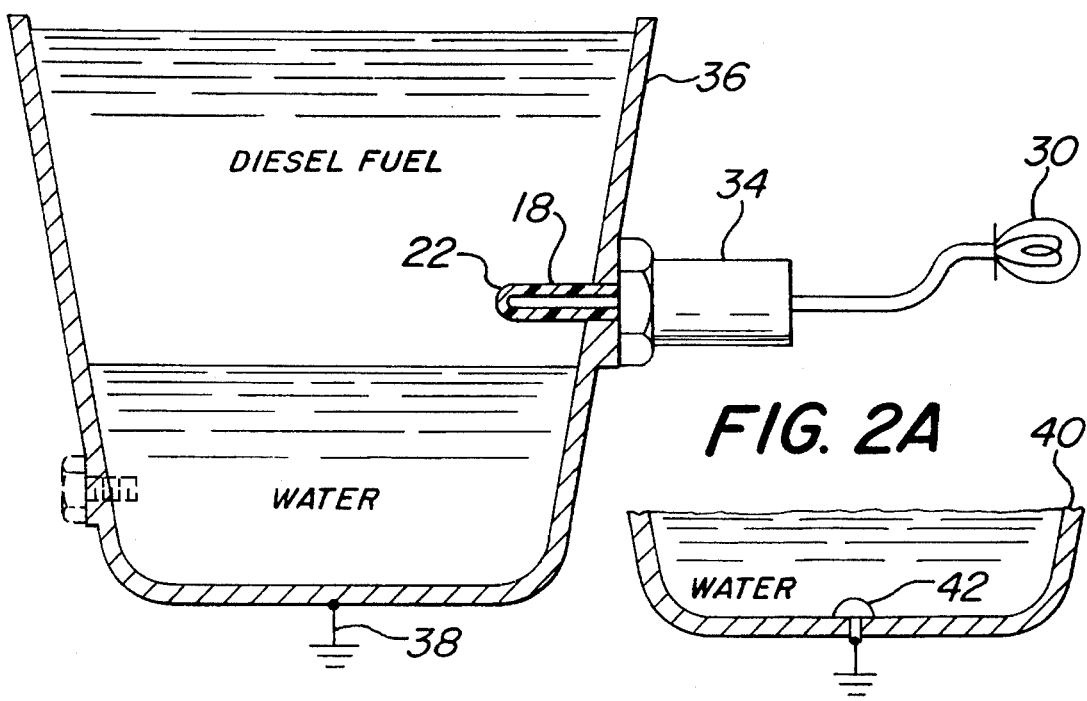
FIG. 2
FIG. 2A

LIQUID LEVEL DETECTOR USING AUDIO FREQUENCIES

FIELD OF THE INVENTION

The present invention relates to a liquid level detector. More particularly, the present invention relates to a liquid level detector which may utilize audio frequencies to produce reliable results utilizing a capacitive element and other components of a size usually associated with RF frequencies.

BACKGROUND OF THE INVENTION

Much work has been done in the field of liquid level detectors. The prior art work has ranged from floatation sensors to capacitance detectors wherein the capacitance changes as a result of a fluid level change. For example, see U.S. Pat. No. 5,287,086—Gibb, wherein the rise in level of the conductive liquid causes an oscillator to switch its mode of oscillation. Others have used a pair of plates between which a non-conducting liquid level is detected by comparing it to a reference value, for example, see U.S. Pat. No. 4,806,847—Atherton, et al. A number of prior art attempts have utilized RF frequencies in liquid level detection systems, for example see U.S. Pat. No. 4,800,755—Fathauer, et al., which utilizes a phase detector for detecting variations in phase angle as a function of probe capacitance.

However, none of the prior art devices provide the advantages of Applicant's invention, including the use of audio frequency for repeatability and reliability of results, sensors that can be mass produced relatively inexpensively and which will work in a conductive liquid where the conductive liquid is in a grounded container or otherwise has circuit ground potential, and which provides a circuit which may be safely utilized in connection with combustible liquids such as gasoline and diesel fuel.

SUMMARY OF THE INVENTION

The present invention provides significant advantages over the prior art.

One of the advantages of the present invention is that it enables the use of audio frequencies, including outputs having rectangular wave forms with a repetition rate in the audio frequency range, to provide repeatability of results and reliability.

Another advantage of the present invention is that it may be fabricated and produced inexpensively thereby enabling its use in a wide variety of applications.

Another advantage of the present invention is that it works in a conductive fluid which is in a grounded container or may be maintained at ground potential.

Still further, an important advantage of the present invention is that the capacitance element within the container or liquid being measured receives signals through a large resistance and, therefore, a very small current may flow even if the capacitive element is short-circuited, thereby providing safety even where the probe may be utilized in connection with combustible liquids such as gasoline, diesel fuel or the like.

Briefly and basically, in accordance with the present invention, a liquid level detection system for detecting a conductive liquid level is provided wherein a conductive element having an insulative coating is mounted in the container containing the conductive liquid. The term container is meant and understood to broadly mean anything that may hold the conductive liquid, from the hull of a ship to a fuel/water separator housing. Some means is employed for applying a circuit ground potential to any conductive liquid in the container. This may be a metal container which is physically connected to a grounded engine block or the like, or it may be a ground contact or screw mounted in a container made of an insulative material. The capacitance between the conductive element and ground being adapted to change by a factor of greater than 100:1 when the conductive element with its insulative coating becomes immersed in the conductive liquid. In many cases, where the conductive element is mounted in a housing and the conductive liquid is ordinary water, the capacitance may change by a factor of about 200:1 when the conductive element becomes immersed in the water. An oscillator is provided for producing an output having an audio frequency. This oscillator may be preferably a multivibrator type oscillator having a rectangular wave output with a repetition rate in the audio frequency range. The output of the oscillator is applied to a pair of series resistors. The conductive element (which forms a capacitive plate) is connected to a point between the series resistors. The oscillator output is fed through the series resistors to an active detector. The oscillator output which is fed to the active detector has an amplitude inversely proportional to the capacitance between the element and ground. The output of the oscillator fed to the active detector drops below a predetermined level when the insulated conductive element becomes immersed in the conductive liquid.

In a presently preferred embodiment, one application includes the detecting of a water level reaching a predetermined level in a fuel/water separator. In another embodiment, two liquid level detectors are mounted at two different levels in the bilge of a boat or ship. The outputs of the two liquid level detectors are fed to a logic gate circuit, such that the logic gate circuit provides a signal to control the operation of a bilge pump. The logic gate circuit turns on the pump when both the first and second conductive elements (each of which forms one plate of a separate capacitor) of the two liquid level detectors are immersed in the conductive liquid and turns off the pump when both the first and second conductive elements are not immersed in the conductive liquid.

The present invention has numerous other applications as suggested hereinafter.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a schematic diagram partially in block diagram form, illustrating a liquid level detector in accordance with the present invention.

FIG. 2 is an elevation view, partially in cross-section, of an application of a liquid level detector in accordance with the present invention utilized to detect the water level in a fuel/water separator.

DETAILED DESCRIPTION OF THE PREFERRED EMBODIMENTS

Figure 3:
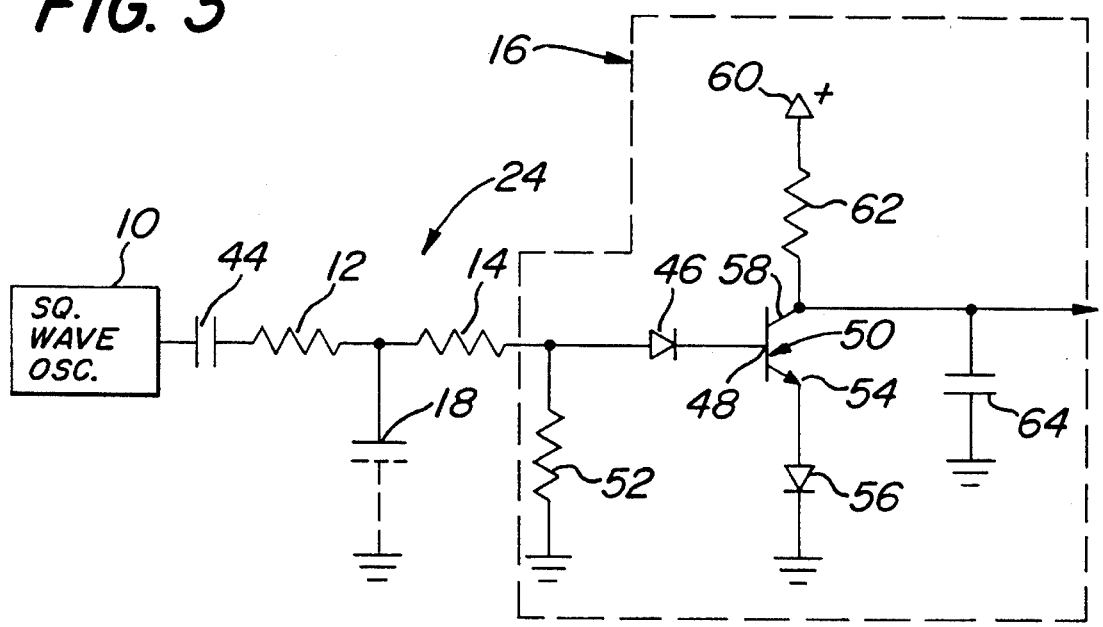
FIG. 3 is a more detailed schematic diagram of a liquid level detector in accordance with the present invention, partially in block diagram form.

Referring now to the drawings, wherein like numerals indicate like elements, there is shown in FIG. 1 a liquid level detecting system in accordance with the present invention. FIG. 2 discloses a specific application of the present invention utilized to detect when the level of water, a conductive liquid, reaches a predetermined level in a fuel/water separator. FIG. 2A shows an embodiment wherein the container may be made of an insulative material, such as a synthetic plastic material, and a ground contact in the form of a ground screw, or otherwise, is mounted within the conductive fluid.

Referring now to FIG. 1, there is shown an audio oscillator 10. Audio oscillator 10 may preferably have a rectangular wave output including a square wave output, as such an oscillator, which is less sensitive to variations in temperature. However, any suitable form of audio oscillator may be utilized in practicing the present invention.

The output of audio oscillator 10 is fed to and through a pair of series resistors 12 and 14 to an active detector 16. A conductive element 18 is connected to a point 20 between the pair of series resistors 12 and 14. Conductive element 18 is provided with an insulative covering which may preferably be a thin film or coating of insulative material 22 as shown in FIG. 2. Alternatively, the insulative material 22 may be anodized aluminum where conductive element 18 is constructed of aluminum. Conductive element 18 has a capacitance to ground. Resistors 12 and 14 and the capacitance of conductive element 18 form a low pass network 24. Elements 12 and 18 may be considered to be connected in series to ground, with the voltage developed across the capacitance of element 18 being fed to active detector 16 through resistor 14.

The output of audio oscillator 10 preferably has a predominant component of about 20 kilohertz (KHZ). Of course, it is understood that somewhat higher or lower frequencies may be utilized in practicing the present invention. Resistors 12 and 14 are preferably resistors having large values in the range of 50 kilohms (Kohms) to 600 Kohms. In the presently preferred embodiment, resistors 12 and 14 have a value of 600 Kohms. Placement of the capacitive element between these two relatively high resistance resistors permits it to be a correspondingly small value of capacitance.

Referring particularly now to FIGS. 1 and 2, taken together, the capacitance to ground provided by conductive element 18 where conductive element 18 is not immersed in a conductive liquid, such as water, as shown in FIG. 2, is low or, in other words, a small value. Capacitance of two parallel plates is generally determined by the formula:

$$C = A/S$$

where "C" is the capacitance in farads, "K" is the permitivity of free space multiplied by the relative dielectric constant of the fluid in farads per meter, "A" is the area between the plates in square meters and "S" is the spacing between the plates in meters.

Where conductive element 18 is not immersed in a conductive liquid, such as water, the spacing to ground is relatively large and the dielectric constant of the separating medium, such as air or diesel fuel, is much lower. When conductive element 18, with its insulative coating 22, becomes immersed in a conductive, grounded fluid, such as water, the spacing between conductive element 18 and ground becomes the thickness of the insulative coating 22 creating a large change in the capacitance to ground sensed by conductive element 18. The relevant dielectric constant is now that of insulative coating 22 and the plates are effectively very close together.

This large increase in capacitance when conductive element 18 is immersed in a grounded conductive fluid, results in a large decrease in the reactance to ground presented by conductive element 18. This effectively places point 20 with a small impedance to ground and, accordingly, the development of a very small voltage from point 20 to ground, thereby resulting in a very small voltage being fed through resistor 14 to active detector 16. Accordingly, the output of square wave oscillator 10 felt at the input of active detector 16 substantially changes from full output to close to null. With a fixed frequency, as in the present case, the capacitive reactance is inversely proportional to the capacitance. Accordingly, as capacitance increases, reactance linearally decreases. The capacitance can easily change by a factor of greater than 80:1 when conductive element 18 is immersed in a conductive fluid and may change by a factor of as much as 800:1.

Active detector 16 senses this change in the output of audio oscillator which is fed to its input and produces an output level change which is fed to threshold detector 26. The output of threshold detector 26 is fed to an operational amplifier 28, which may be utilized to drive an indicator 30, such as a light bulb. The output of threshold detector 26 may also be fed to logic circuitry 32 which may provide data, such as an indication of the period of time that indicator 30 has been activated, which may be useful in determining how long the water level has remained high before it has been drained, in an application such as that shown in FIG. 2.

Audio oscillator 10, low pass network 24, active detector 16, threshold detector 26 and operational amplifier 28 may all be contained within a housing 34, such as that shown in FIG. 2.

In a presently preferred embodiment, audio oscillator 10 and active detector 16 may be constructed from a single CMOS chip with the generic designation of 4011; one such suitable chip is presently commercially available from Motorola Company. Such chips are commercially available for less than $0.25, thereby enabling all of the electronics of the liquid level detection system of the present invention to be inexpensively produced in mass quantities for less than one dollar. The high impedance circuitry of low pass filter 24 makes the circuitry safe for the insertion of conductive element 18 into various combustible and explosive fluids, including gasoline. The structural arrangement and circuitry involved enables the circuit to operate reliably even where dirt and the like may come in contact with the insulated coated conductive element, such as in bilge pump applications.

Referring further to FIG. 2, there is shown a fuel/water container 36 which is shown in cross-section to be made of a conductive material, such as iron, steel, aluminum or the like. In practice, this is mounted to other automotive grounded components, such as engine blocks and the like, thereby providing a grounded container 36. Schematically, this is shown at 38, although the actual ground connection would be at the upper end where it connects to the other automotive components. As is well known and need not be described here in detail, the water separated from fuel, such as diesel fuel, settles to the bottom of container 36. As more water is removed from the diesel fuel, the water level rises. When the water level rises to the level of conductive element 18, this is detected and an indicator such light bulb 30 is activated, alerting the operator of the vehicle to the fact the water needs to be removed from the fuel/water separator. This is particularly important in diesel engines as much damage to the diesel engine may be caused by the presence of water in the fuel supply.

FIG. 2A shows an alternate arrangement of providing ground to the conductive fluid, such as water, where the container 40 is constructed of an insulative material. In such a case, a ground contact, such as a ground screw 42 connected to ground, may be mounted within the conductive liquid, such as by being mounted through the insulative container 40.

Referring now to FIG. 3, there is shown audio oscillator 10, low pass network 24 and active detector 16 in schematic form in greater detail. The output of square wave oscillator 10 is fed through capacitor 44 and through series resistors 12 and 14 and diode 46 to the base 48 of transistor 50. The cathode side of diode 46 is provided with a resistor 52 to ground, which may have a value of 1 megohm. The emitter 54 of transistor 50 is connected to ground through a biasing diode 56 which may be a 1N914. Diode 46 may also be 1N914 in a preferred embodiment. It is understood that the values given herein are for the illustration of a presently preferred embodiment, and it is understood that other values and other components may be utilized in practicing the present invention. In a presently preferred embodiment, the collector 58 of NPN transistor 50 is connected to a positive 10 volt supply 60 through a resistor 62. The collector is also connected with a 1 micro farad capacitor 64 to ground. This forms the active peak detector. NPN transistor 50 may be a 2N2222A with a beta of greater than 100. Square wave oscillator 10 may be constructed from one half of the MC 4011.

The output of square wave oscillator 10 may be a square wave voltage output of 9 volts peak to peak. The output fed through capacitor 44 may be −4½ volts to +4½ volts. Resistors 12 and 14 may be 100 kohms each, thereby limiting current flow to conductive element 18 to 0.12 milliamp even if conductive element 18 were shorted to ground with a 12 volt supply voltage, which is typical in automotive vehicles.

The −4½ to +4½ volt output of the oscillator is fed through diode 46 to the base of transistor 50 when conductive element 18 is not immersed in a conductive fluid. However, when conductive element 18 becomes immersed in a conductive fluid connected to ground, the positive potential supplied through diode 46 to base 48 of transistor 50 drops to practically nothing, shutting off transistor 50. This causes capacitor 64 to be charged. When transistor 50 is turned on due to conductive element 18 not being immersed in the grounded conductive liquid, capacitor 64 is effectively placed in parallel with diode 56 limiting the potential across capacitor 64 to that value, approximately 1.0 volt.

Figure 4:
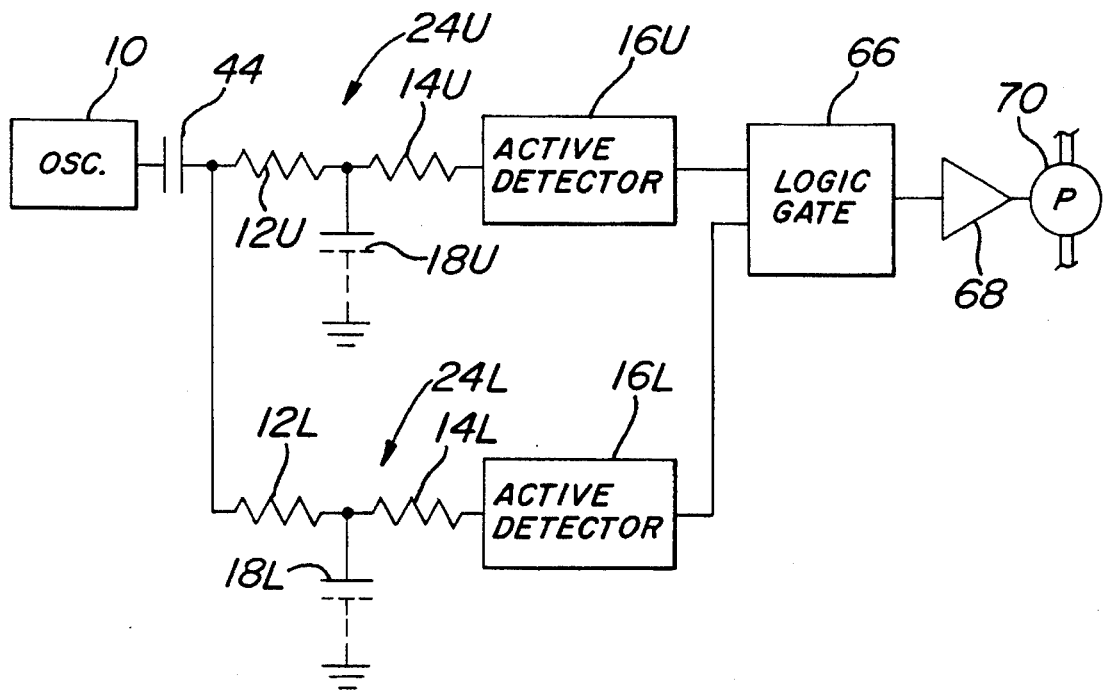
FIG. 4 is a schematic diagram, partially in block diagram form, of another application of the present invention utilized to control the operation of a pump, such as a bilge pump.

Referring now to FIG. 4, there is shown another embodiment of the present invention wherein a pair of liquid level detection systems of the type described in FIGS. 1, 2 and 3 are utilized to control the operation of a bilge pump. In the embodiment shown in FIG. 4, one of the detectors is mounted at a lower level and the second at an upper level in a container, such as a bilge, that collects a conductive liquid, such as water. The conductive liquid is grounded either by being in a grounded conductive bilge (metal ship) or by a ground placed in the conductive liquid area, such as in a fiber glass boat.

Corresponding components in FIG. 4 will be given the same number with an additional designation of "L" for lower and "U" for upper added thereto. As shown in FIG. 4, an audio oscillator 10 supplies an audio output, which may preferably be a square or rectangular wave output through capacitor 44. The rectangular wave output fed through capacitor 44 is supplied to both low pass networks 24L and 24U. The lower low pass network 24L, which is physically mounted lower in the container, such as the bilge of a boat or ship, includes an insulative conductive element 18L along with series resistors 12L and 14L. The upper low pass network 24U includes an insulative conductive element 18U and series resistors 12U and 14U. The outputs of the low pass networks are fed to active detectors 16L and 16U, respectively. The outputs of the active detectors 16L and 16U are fed to a logic gate 66. Logic gate 66 contains circuitry which responds to a negative going transition, and causes bilge pump 70, through operational amplifier 68, to turn on when the output of both active detectors 16L and 16U to go low or negative. That is, when the water has risen such that both of the conductive elements 18L and 18U are immersed in water, and not before, logic gate 66 turns pump 70 on and then turns off the pump when both of the active detectors 16L and 16U go high, that is both conductive elements are no longer immersed in water. In other words, the logic gate circuit 66 enables the operation of pump 70 in such a manner that the pump does not go on until a predetermined high level of water is reached and the pump continues to operate until the water level is reduced to below the level of the lower detector.

It will be apparent to those skilled in the art that various changes and modifications may be made to the circuit and structural details, and that the present invention lends itself to various other applications, including, but limited to, circuitry to determine whether the fluid is petrochemical or water, a depth gauge by mounting a plurality of said sensors in a vertically spaced relationship, sensors in automotive vehicles for detecting levels of oil, power steering, brake fluid and the like thereby eliminating dipsticks, and other variations which will be apparent to those skilled in the art.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A liquid level detecting system for detecting a conductive liquid level in a container, comprising:

a conductive element having an insulative coating mounted in said container;

means for applying circuit ground potential to any conductive liquid in said container;

capacitance between said element and ground changing by a factor of greater than 80:1 when said conductive element with its insulative coating becomes immersed in said conductive liquid;

an oscillator producing an output having an audio frequency;

a pair of series resistors, said conductive element being connected to a point between said series resistors;

said oscillator output being fed through said series resistors to an active detector, said oscillator output fed to said active detector having an amplitude inversely proportional to the capacitance between said element and ground;

wherein said output of said oscillator fed to said active detector drops below a predetermined level when said conductive element becomes immersed in the conductive liquid.

2. A liquid level detecting system in accordance with claim 1 wherein said means for applying a ground potential to any conductive liquid in said container comprises a grounded container.

3. A liquid level detecting system in accordance with claim 1 wherein said means for applying ground potential to any conductive liquid in said container comprises a grounded contact mounted within said container where said container is made of an insulative material.

4. A liquid level detecting system in accordance with claim 1 wherein said oscillator produces a rectangular wave output.

5. A liquid level detecting system in accordance with claim 1 which operates on a power supply voltage of 24 volts or less and wherein each of said series resistors have a resistance of at least 50 Kohms.

6. A liquid level detecting system in accordance with claim 1 wherein said active detector comprises a transistor circuit, said oscillator output being fed through said resistors and a diode to a base of said transistor, a capacitor in the collector circuit of said transistor being discharged through a collector-emitter circuit of said transistor in response to the signal applied to the base of the transistor.

7. A liquid level detecting system for detecting conductive liquid levels, comprising:

a first and a second conductive element mounted in spaced relationship such that at a lower liquid level a first of said conductive elements will be immersed in the conductive liquid and at a second liquid level said first and said second conductive elements will be immersed in the conductive liquid;

means for applying circuit ground potential to said conductive liquid;

an oscillator producing an output having an audio frequency;

a first and a second pair of series resistors, said first conductive element being connected between said first pair of series resistors and said second conductive element being connected between said second pair of series resistors;

said oscillator output being fed through said first and second pair of series resistors to a first and second active detector, respectively, said oscillator output fed to each of said active detectors having an amplitude inversely proportional to the capacitance of said conductive element;

the output of said first and second active detectors being fed to a logic gate circuit such that said logic gate circuit provides a signal to control the operation of a pump, said logic gate circuit turning on said pump when both said first and second conductive elements are immersed in the conductive liquid and turning off said pump when both said first and second conductive elements are not immersed in the conductive liquid.

* * * * *

UNITED STATES PATENT AND TRADEMARK OFFICE
CERTIFICATE OF CORRECTION

PATENT NO. : 5,623,252
DATED : April 22, 1997
INVENTOR(S) : John A. Cacciola and Randal J. Cacciola It is certified that error appears in the above-indentified patent and that said Letters Patent is hereby corrected as shown below:

Column 3, line 54, after "C=" insert -- K --.

Column 5, line 29, before "1" insert -- . --.

Signed and Sealed this

Twenty-fourth Day of June, 1997

*Attest:*

*Attesting Officer*

BRUCE LEHMAN

*Commissioner of Patents and Trademarks*